Oct. 16, 1928.

F. E. VERSE 1,687,531

KNOB AND KNOB LIKE DEVICE

Filed June 15, 1927

Patented Oct. 16, 1928.

1,687,531

UNITED STATES PATENT OFFICE.

FRITZ EGON VERSE, OF ISERLOHN, GERMANY, ASSIGNOR TO THE FIRM: WESTFÄLISCHE METALLWARENFABRIK G. M. B. H., OF ISERLOHN, GERMANY.

KNOB AND KNOBLIKE DEVICE.

Application filed June 15, 1927. Serial No. 198,875.

My invention relates to new and useful improvements in the construction of knobs and knoblike devices which are commonly used as handles for door locks, drawers etc., and more especially to that type of knobs which are made of china, glass, horn or the like and have a bowl—or cup-shaped metallic mounting into which the knob proper is rigidly fixed.

One of the objects of my invention is to provide new means whereby the knob can be more accurately and firmly secured to its mounting than it was possible heretofore.

Another object of the invention is to thus design the mounting of the knob that its component parts can be easily assembled and in assembled position will remain firmly and permanently locked with each other, and with the knob proper, and with the shank to which the knob is to be attached, thus enabling the knob to withstand long wear and tear, and even rough usage without becoming loosened or detached.

Figure 1:
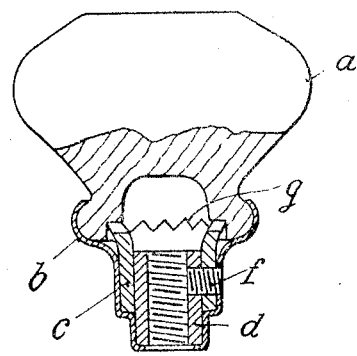
Figure 3:
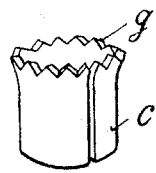
Figure 2:
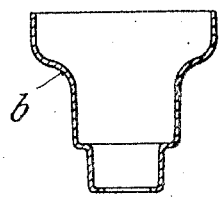
Figure 4:
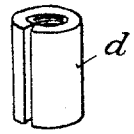
Figure 5:
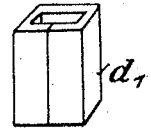

The nature and scope of my invention will be more fully understood from the following specification and the accompanying drawing in which Fig. 1 is a front elevation showing a central sectional view of part of the device, the knob and its metallic mounting, Fig. 2 shows a vertical section through the outer shell holding the knob, Figs. 3–5 are perspective views showing sleevelike fittings as used according to this invention.

Heretofore the metallic parts for knobs were mostly made from bars of brass or other non-corrosive metal by turning, milling, boring operations and by threading the bore hole by means of which the knob was fastened to the threaded shank, serving as a holder.

In other cases cups drawn or stamped of sheet metal were used for mounting the knob therein, the inner space of the cup being filled with a solid piece of cast iron, or other metal in which a threaded bore hole was made as referred to above, while a small clamping screw $f$ (Fig. 1) was provided for fixing the filler in the cup.

This method of fixing entailed the disadvantage that the two parts of the mounting viz the cup and the filling element became easily loosened and detached from each other with the result that in turn also the knob proper was soon detached from the shank even if the threading of the latter was undamaged.

As indicated hereinbefore the invention aims at overcoming the said disadvantage and to provide an improved type of mountings for knobs which in addition to their better mechanical effect as fastening elements can be produced at a lower price than those made of solid brass.

According to this invention two or more sleevelike metallic bodies of a resilient nature are inserted into the mounting of the knob completely filling the lower part of the same, said sleeves being adapted to be forced under friction into each other and into the inner space of the cup $b$—as seen in Fig. 1— which is preferably made of drawn or stamped sheet metal.

The frictional contact occurring between the sleeves and the cup-shaped mounting proper may be modified for instance, by providing a longitudinal slit in the sleeves, thus enhancing their resiliency and clamping effect, and by varying the number of sleeves nested within each other.

Referring to Fig. 1 of the drawing $a$ designates the knob which is to be rigidly fixed to the brim of the funnel shaped cup $b$ and to the fastening elements of the latter. For this purpose two sleeves $c$, $d$ are forced with considerable friction into the lower part of the cup which in the present embodiment of my invention comprises two stepped portions, thereby mutually clamping together firmly and permanently the said sleeves $c$, $d$ and the cup $b$.

As seen in Fig. 3 the larger sleeve $c$ is provided with a toothed crown $g$, the teeth of which engage indents provided at the bottom of the knob and thus prevents any rotary movement after the latter has been clamped by and within the cavity of the annular rim formed at the top of the cup $b$.

The innermost sleeve $d$ is thereupon threaded in the usual manner. The clamping screw $f$—which in Fig. 1 is only shown for demonstration; it can be dispensed with entirely, if desired, as both sleeves $c$, $d$ are very firmly held in place by reason of their mutual frictional contact produced by the high tension to which the sleeves and the cup are subjected.

Various changes and modifications may be made in the design and arrangements of the component parts of the improved knob, described above, without substantially deviating from the spirit of or sacrificing the advantages of my invention.

What I claim is:

1. In a door knob the combination comprising a knob having a plurality of indents at its bottom, a cup holding the aforesaid knob by its inwardly bent rim, a plurality of resilient sleeves frictionally held in nested arrangement in the lower part of aforesaid cup, and a plurality of teeth on the outer sleeve engaging the aforesaid indents in the bottom of the knob.

2. In a door knob having a funnel-shaped cup and a knob having indents at its bottom and being held by the rim of said cup, the combination comprising a plurality of resilient sleeves frictionally held in nested arrangement in the lower part of aforesaid cup, the outer sleeve being provided with teeth engaging the indents in the bottom of the knob.

3. In a door knob having a funnel shaped cup and a knob having indents at its bottom and being held by the rim of said cup, the combination comprising a plurality of resilient sleeves frictionally held in nested arrangement in the lower part of aforesaid cup, each sleeve having a longitudinal slit and the outer sleeve being provided with teeth engaging the indents in the bottom of the knob.

4. In a door knob having a funnel-shaped cup and a knob having indents at its bottom and being held by the rim of said cup, the combination comprising a plurality of resilient sleeves frictionally held in nested arrangement in the lower part of aforesaid cup, the outer sleeve being provided with outwardly projecting teeth engaging the indents in the bottom of the knob.

5. In a door knob having a funnel-shaped cup and a knob having indents at its bottom and being held by the rim of said cup, the combination comprising a plurality of resilient sleeves frictionally held in nested arrangement in the lower part of aforesaid cup, each sleeve having a longitudinal slit and the outer sleeve being provided with outwardly porjecting teeth engaging the indents in the bottom of the knob.

In testimony whereof I have signed my name to this specification.

FRITZ EGON VERSE.